United States Patent [19]

Gimza

[11] Patent Number: 5,530,857
[45] Date of Patent: Jun. 25, 1996

[54] AUTOMATED SHOP FLOOR CONTROL SYSTEM AND METHOD OF OPERATION THEREOF

[75] Inventor: Jean-Luc Gimza, Angers, France

[73] Assignee: Bull, S.A., Paris, France

[21] Appl. No.: 281,988

[22] Filed: Jul. 29, 1994

Related U.S. Application Data

[63] Continuation of Ser. No. 666,568, Mar. 8, 1991, abandoned, which is a continuation of Ser. No. 214,065, Jun. 30, 1988, abandoned.

[30] Foreign Application Priority Data

Jul. 2, 1987 [FR] France .................................. 87 09382

[51] Int. Cl.$^6$ .......................... G06F 15/16; G06F 15/163
[52] U.S. Cl. .......................... 395/600; 395/800; 395/830; 395/835; 395/838; 395/182.10; 395/311; 364/DIG. 1; 364/282.1; 364/275.3; 364/275.4; 364/276; 364/275.2
[58] Field of Search .................................. 395/600, 275, 395/325, 800, 830, 835, 838, 182.10, 311; 364/DIG. 1, DIG. 2

[56] References Cited

U.S. PATENT DOCUMENTS

| | | | |
|---|---|---|---|
| 4,093,981 | 6/1978 | McAllister et al. | 364/200 |
| 4,686,698 | 8/1987 | Tompkins | 379/53 |
| 4,694,396 | 9/1987 | Weisshaar et al. | 364/200 |
| 4,697,239 | 9/1987 | Sicard et al. | 364/468 |
| 4,714,995 | 12/1987 | Materna | 395/600 |
| 4,736,374 | 4/1988 | Kump | 371/15.1 |
| 4,827,423 | 5/1989 | Beasley et al. | 364/468 |
| 4,829,445 | 5/1989 | Burney | 364/468 |
| 4,831,582 | 5/1989 | Miller et al. | 364/900 |
| 4,845,634 | 7/1989 | Vitek et al. | 364/468 |
| 4,855,906 | 8/1989 | Burke | 364/200 |
| 4,870,590 | 9/1989 | Kawata et al. | 364/468 |
| 4,888,726 | 12/1989 | Struger et al. | 364/900 |
| 4,901,218 | 2/1990 | Cornwell | 364/468 |
| 4,937,784 | 6/1990 | Masai | 395/325 |
| 4,972,367 | 11/1990 | Burke | 395/275 |
| 5,007,017 | 4/1991 | Kobayashi | 395/200 |

OTHER PUBLICATIONS

Electronics, Oct. 15, 1987 "Factory Automation".
Computerworld, Feb. 4, 1987 by James Herman "Net Management Streamline Your Data Flow", consists of 3 pgs.
Elektronik, pp. 128–132; 3 Oct. 1986; Dip–Ing Edmund Segl "Zellenstruktur am MAP–Backbone".
Automatisierungstechnische Praxis A.T.P. vol. 28, No. 3; pp. 109–116; Pfeifer et al "Derzeitige Situation und Chancen von MAP", 1986.
Computer Design, vol. 23, No. 2, Feb. 1984 by James A. Fontaine "Controller and Micro Team Up For Smart Ethernet Mode" pp. 215–223.

*Primary Examiner*—Thomas G. Black
*Assistant Examiner*—Jean R. Homere
*Attorney, Agent, or Firm*—Kerkam, Stowell, Kondracki & Clarke; Edward J. Kondracki

[57] ABSTRACT

In a method and system for control of a shop floor of a factory, an individual work station (13) or a work station of an outfit (14a–14d) is associated with the work station of a corresponding local interface unit (18a–18e), comprising standard widespread hardware and software and connected to a local area network (11) in order to be connected with the shop floor control center (12) of the factory (10). The work stations of the local interface units are incorporated into a configuration in accordance with a standardized model making it possible to perform specific tasks within this model. Advantageously, the OSI model of the ISO standard is used to perform the specific tasks in the application layer of the OSI model. The work station of a local unit can advantageously substitute for the work station of the associated outfit.

20 Claims, 5 Drawing Sheets

AUTOMATED SHOP FLOOR CONTROL SYSTEM AND METHOD OF OPERATION THEREOF

This is a continuation of application Ser. No. 07/666,568 now abandoned, filed Mar. 8, 1991 which is a continuation of application Ser. No. 07/214,065 filed Jun. 30, 1988 now abandoned.

BACKGROUND OF THE INVENTION

The invention relates to a method and a system for shop floor control of work stations, in particular for factory automation. More particularly, it relates to automation of work stations whether or not associated with shop floor outfits.

An individual work station comprises a console intended for an operator and is sometimes associated with peripherals such as bar-code readers. This work station is connected to a shop floor control center, typically including one or more computers associated with data file servers and internal dedicated monitors. A similar work station may be associated with the control computer of a shop floor machine. The unit comprising the machine and the computer provided with its work station comprises an outfit. The set of work stations, whether or not associated with outfits, and connected to the shop floor control center, comprises a shop floor control system for factory automation.

In an outfit, the dialogue between the console of the work station and the computer depends on the software of the computer. It is designed to perform highly specific functions and to make the outfit very powerful. It is, accordingly, ordinarily highly sophisticated. The computer is also provided with a line for communication with the outside. The line is often an asynchronous line. However, the present trend is to equip the computer with a high-output line capable of direct connection with a local area network (LAN). Consequently the possibilities for dialogue offered by the computer communication line are quite variable, ranging from the simplest to the most sophisticated depending on the outfit. At the present time, however, these possibilities are often limited by the presence of only one asynchronous line. The computer may also have a storage unit comprising disks, diskettes or tapes.

The presently most powerful shop floor control system uses a LAN connecting the outfits to the shop floor control center. There are several types of LAN. For example, one well-known type uses the transmission technique known as CSMA/CD (carrier sense multiple access/collision detection), an example being the "Ethernet" network. Its application to industry, however, presents serious disadvantages. In industry, a local area network more recently used is one that uses the token bus technique, an example being the MAP (Manufacturing Automation Protocol) network.

On the subject of the local area network, the ISO (International Standards Organization) has currently defined a model for interconnection of open systems, known as the OSI (open systems interconnect) model, defining 7 layers. The majority of present-day networks, such as those based on the Ethernet network, rely on the low-layer services of the OSI model. The applications typically use the services offered by the fourth layer, known as the transport layer, and the fifth layer, known as the session layer. Finally, the industrial networks, such as the MAP network, are beginning to offer standardized services in the sixth layer, known as the presentation layer, and the seventh and last layer known as the application layer or problem-oriented layer.

Naturally, it would be desirable to be able to connect all the work stations of a shop floor, whether or not they are associated with outfits, to a local area network to obtain very powerful automation of the shop floor. However, the difficulties encountered are major and varied. It is often found that in a large factory, such as one for manufacturing printed circuit boards and assembling components on the boards, existing or planned future outfits are highly heterogenous in terms of the processors, operating systems or internal dedicated monitors. In this case, each outfit presents a specific problem. The addition of individual work stations adds further specific problems.

In a shop floor control system, the individual work stations are connected directly to the shop floor control center. The shop floor control center must directly manage each of the individual work stations. This is a heavy responsibility for the shop floor control center and must be adapted to the number and specificity of the work stations. Because of this management responsibility, it is, for example, impossible to transmit to an individual work station documents in the form of text associated with drawings and/or images, such as complex digitized documents. Yet an individual work station may need such data.

The problems associated with the shop floor control of factory outfits depend on the type of these outfits. They differ depending on whether the outfits are not directly connectable to a LAN, or are directly connectable to or already connected to a LAN.

Since local area networks have only recently been extended to the automation of existing factories, many outfits for these factories have not been designed for connection to a LAN. In an outfit of this type, the computer is simply open to the outside by an asynchronous communication line. This line furnishes a low-output link and must be connected directly to the entire set of file servers of the shop floor control center. Hence the software of all the file servers must be adapted as a function of the outfit connected. This adaptation itself is already time-consuming and expensive. Moreover, the outfits of this type generally have different software and dialogue protocols. Consequently, adding an outfit of a different type requires fundamental modification of the software of all the file servers.

Outfits that are connectable or already are connected to a LAN also present problems in their shop floor control through this LAN. These problems often arise for the shop floor control of outfits of the foregoing type as well. For example, an outfit having a computer not provided with local programs must seek programs in an file server of the shop floor control center. Thus if the file server should malfunction, it blocks all the outfits of this type. On the other hand, the dialogue between the operator and the outside is currently done by menus. The dialogue, thus, often requires a large number of delicate operations and so impairs the productivity of the associated work station.

Other problems are associated with the scale of manufacture of the factory. For a large-series job, the basic programs are normally on disks and the supplementary programs are sent via the communication line to be stored locally on various media (disks or diskettes). The routing thus depends on the quality of the line and above all on its availability. When the shop floor control bears on small series requiring a great number of references, the shop floor control requires a great number of manipulations. This entails numerous non-productive periods and complex management of disks and diskettes as well as updating them are required. It gives rise to the notion of transparency at the level of the files used and presents the general problem of archiving, saving and management of the technical status at each work station or type of work station.

SUMMARY OF THE INVENTION

The invention overcomes all these disadvantages by providing a standard interface formed between the local area network and the work stations of the shop floor, whether or not they are associated with outfits.

According to the invention, a method of shop floor control of at least one work station connected to a shop floor control center comprises associating that work station with the work station of a local interface unit which embodies standard, widespread hardware and software that are connected to the shop floor control center by a local area network, and configuring the work station of the local interface unit into a design in accordance with a standardized model in order to make it possible with the local interface unit to perform specific tasks within this model.

At present, the preferred model is the OSI model of the ISO standard, and the specific tasks are performed at the level of the sixth and seventh layers.

If the local area network offers standardized services at the level of the sixth and seventh layers (presentation and application layers), the specific tasks augment those available in standard fashion over these layers. The local interface unit is also associated with the work station of an outfit connected with the shop floor control center. The software of the local interface unit is independent of the software specific to the functioning of the outfit and used solely by the computer of the outfit, for the functioning of the machine, for example. The work station of the local unit may substitute entirely for the work station of the outfit.

In another aspect, a shop floor control system in accordance with the invention for at least one work station connected to a shop floor control center is characterized in that the work station is associated with another work station of a local interface unit that incorporates processing means which has standard, widespread hardware and software, which communicates with a local area network connected to the shop floor control center, and which manages a local storage unit, as a cache storage in a multiprocessor architecture having the local area network as a bus, and having the local storage unit as a specialized element of the multiprocessor architecture.

The characteristics and advantages of the invention will become apparent from the ensuing detailed description of an exemplary embodiment, taken in conjunction with the appended drawings.

DESCRIPTION OF THE PREFERRED EMBODIMENTS

Figure 1:
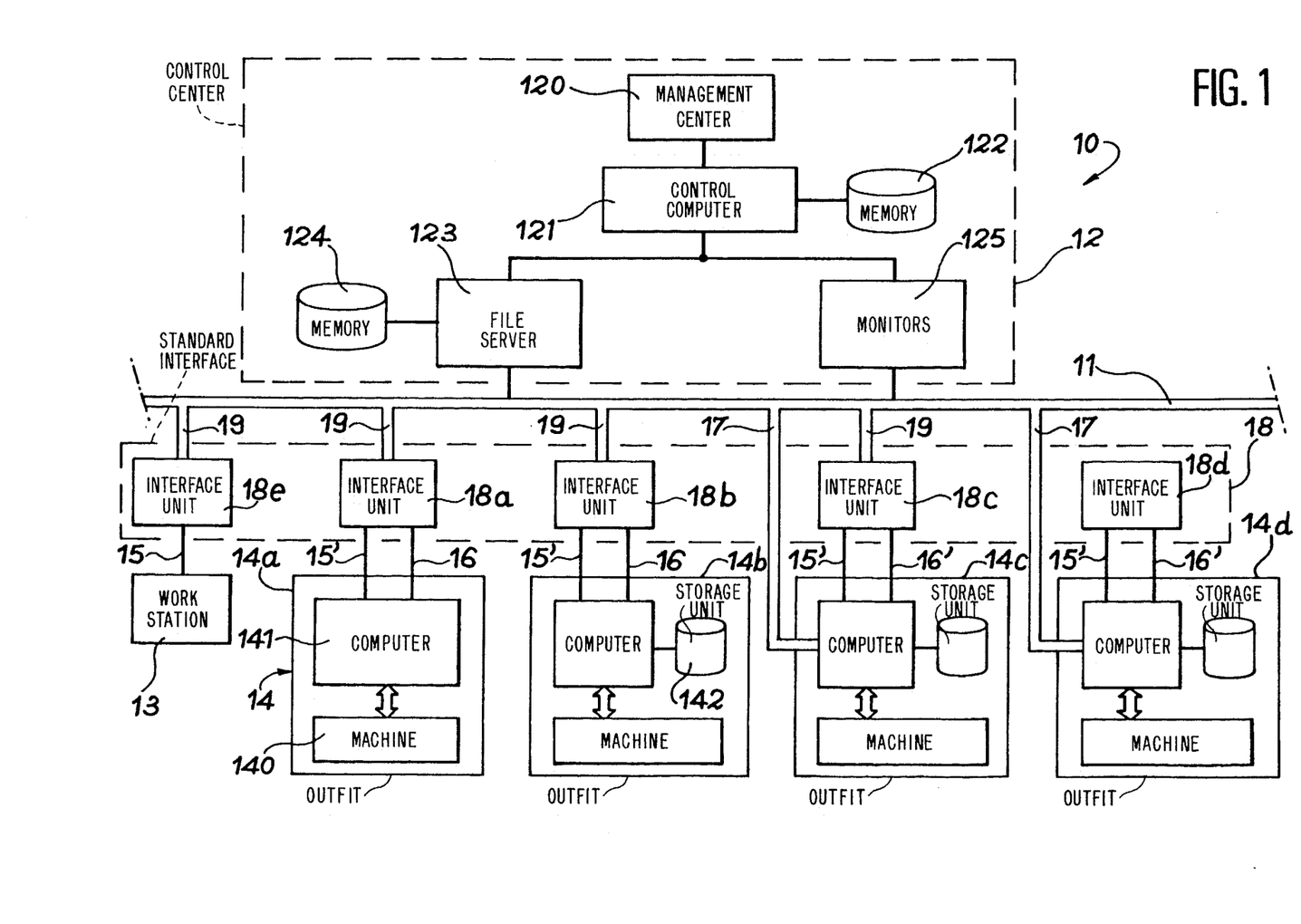
FIG. 1 is a block diagram illustrating an automated factory in accordance with the invention.

FIG. 1 illustrates a shop floor control system 10 in accordance with the invention. The shop floor control system 10 is designed around a local area network 11 of any type, preferably a standard industrial network of the MAP type. In the conventional manner, a shop floor control center 12 is connected to the local area network (LAN) 11. The shop floor control center 12 has a conventional structure, for example comprising a management center 120 connected to a shop floor control computer 121, to which a central memory 122, a set of data file or archive servers 123, each associated with a memory unit 124, and a set 125 of monitors dedicated to localized applications are connected. Finally, the shop floor control system 10 shown includes an individual work station 13 and outfits 14 of four different types (14a, 14b, 14c, 14d).

Figure 2:
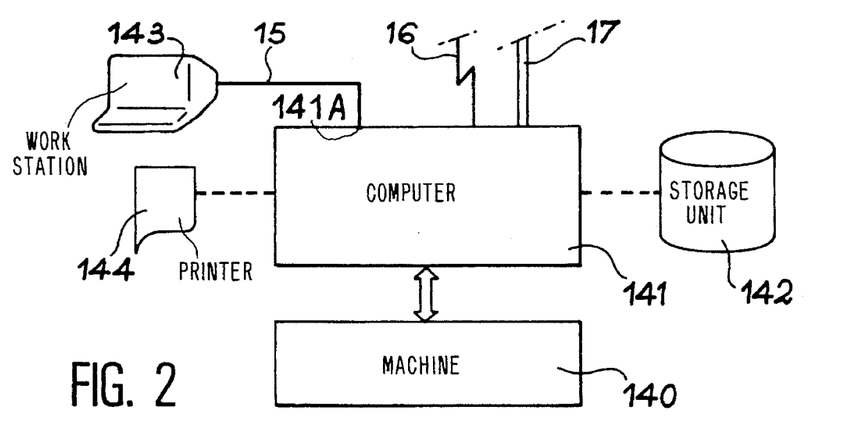
FIG. 2 is a schematic view of an example of a conventional outfit.

FIG. 2 schematically illustrates the general conventional structure of an outfit 14. An outfit 14 substantially comprises a machine 140 connected to a computer 141, possibly associated with a storage unit 142. The possibility of the connection between the computer 141 and the storage unit 142 is represented by a broken line. The computer 141 has an input/output connector of the terminal 141A connected to at least one work station 143 via a link 15. The computer 141 is open to the outside by the intermediary of a communication line, such as an asynchronous line 16 or a line 17 adapted for communicating directly with a LAN by an interface particular to the computer. The outfits 14a and 14b of FIG. 1 are assumed to have, originally, only the asynchronous line 16, while the line 17 is particular to the outfits 14c and 14d. Optionally, a printer 144 is associated with the computer 141.

On the other hand, the individual work station 13 is connected in a conventional manner, by the intermediary of a link 15, to the shop floor control center 12. The link 15 is of the same type as the link 15 associating a work station 143 with the computer 141 of a conventional outfit 14.

The invention will now be described, referring to FIGS. 1, 3, 4 and 5.

Referring to FIG. 1, the invention comprises associating the individual work station 13 or the work station 143 of an outfit 14 with a local interface unit. The local interface units 18a–18d are connected respectively to the outfits 14a–14d, and the local interface unit 18e is connected to the individual work station 13. The local interface units 18a–18e each comprise standard hardware and standard software of a widely distributed or a widespread type. The term "widespread hardware" is intended to mean a multipurpose computer of the personal computer or compatible type. The set of local units thus forms a standard interface 18 in accordance with the invention.

Generally, the method for shop floor control according to the invention of a work station 13 or 143 connected to a shop floor control center 12 by the intermediary of a link 15 thus comprises, first, associating the work station 143, 13 with a respective interface unit 18a–18e comprising widespread hardware and software and which is connected to the shop floor control center 12 by the LAN 11. The term "association" or "associating" is to be understood in its logical rather than physical sense, as will become clearly apparent from the ensuing description.

Moreover, present-day local area networks are quite varied and generally function by routines that are themselves varied. The method according to the invention further comprises putting each work station 13, 143, 182 into a design in accordance with the same standardized model making it possible to perform specific tasks with this model, using the respective local interface unit 18a–18b. The preferred model of the invention is the OSI model of the ISO. Typically, present-day designs function at the level of the fourth and fifth layer of the OSI model of the ISO. The method according to the invention now comprises putting the work stations into a design in accordance with the OSI model and, with the respective local interface unit, performing specific tasks at the level of the application layer, also known as the problem-oriented layer, of the OSI model.

It is clear that the specific tasks in the application layer can also be performed in the presentation layer of the OSI model. If the LAN 11 is sophisticated, of the industrial token bus type of LAN, for example, then at present it permits standard tasks to be performed at the level of the application layer of the OSI model. In this case, the method according to the invention comprises performing specific tasks in this layer which are complementary to the standard tasks available on the network. Examples of specific applications will be given hereinafter.

Figure 3:
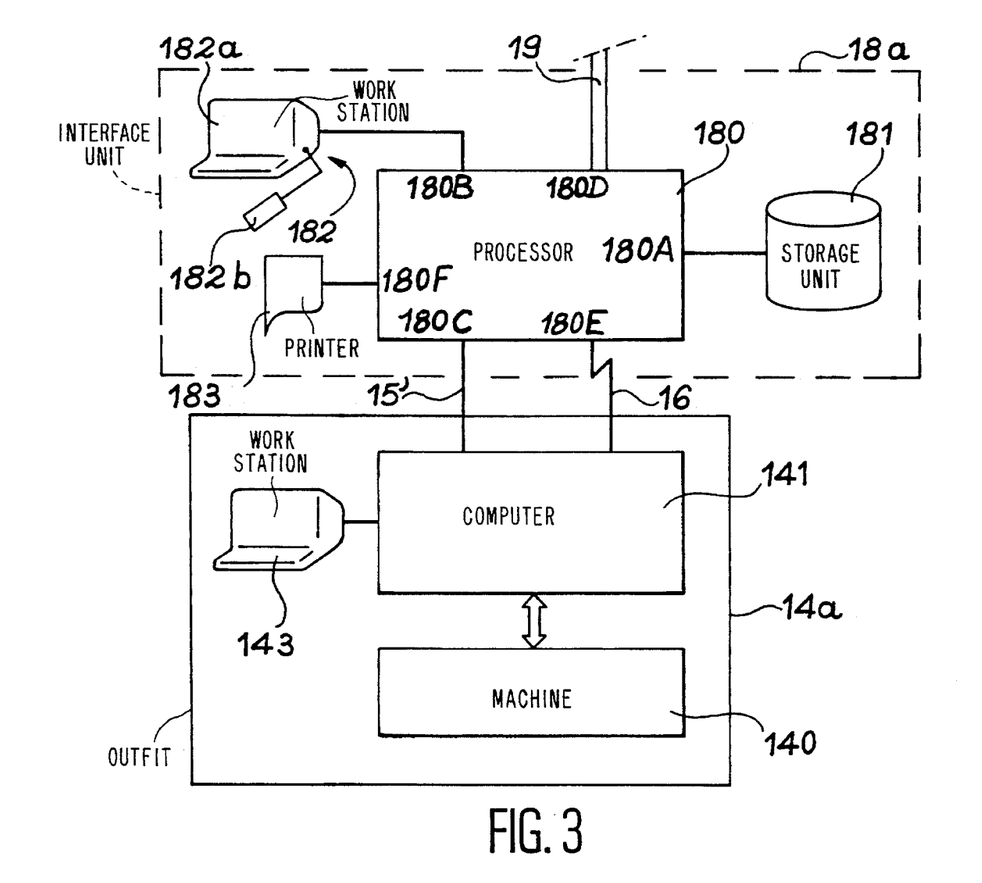
FIG. 3 is a schematic view of an example of an outfit represented in FIG. 2 and associated with a local interface unit according to the invention.

FIG. 3 illustrates the structure of the local interface unit 18a associated, in accordance with the invention, with the work stations 143 of the outfit 14a shown in FIG. 1. The outfit 14a is a conventional outfit such as that shown in FIG. 2, in which there is no link 17 or storage unit 142. The local interface unit 18a is formed substantially by a processing block 180 connected via an input/output connector 180A to a storage unit 181. The processing block 180 comprises standard widespread hardware and software, The processing block 180 is also connected via an input/output connector 180B to a terminal 182 similar to the terminal 143. The terminal 182 shown hence comprises a console 182a and a bar-code reader 182b. In an automated factory in accordance with the invention, each local unit is BM60 hardware (Bull Micral). A logical terminal link 15' is made between a terminal emulation connector 180C of the processing block 180 and the terminal connector 141A of the computer 141 (FIG. 2). The processing block 180 includes an input/output connector 180D connected to a communication line 19 adapted for direct connection with the LAN 11. The line 19 is, hence, similar in type to the line 17 indicated in the outfit 14 shown in FIG. 2. Finally, the processing block 180 includes an input/output connector 180E that receives the asynchronous communication line 16 of the computer 141 of the outfit 14a. Hence the connector 180E is a communication emulation connector. Optionally, the processing block 180 may also have an input/output connector 180F for a connection with a printer 183. It should be noted that in certain outfits, the same physical communication lines can perform the role of the (logical) terminal link 15' and the (logical) line 16.

The principle of the invention hence comprises the association, in the logical sense of the term, of the work station 143 of the computer 141 of the outfit 14a with the work station 182 of the local interface unit 18a serving as a standard interface with the LAN 11 connected to the shop floor control center 12. Because of this association, the tasks originally assigned to the work station 143 are at least in part shifted to the level of the local interface unit 18a. In this local unit, certain tasks are executed automatically by the processing block 180. To the greatest possible extent, all the tasks that can be executed automatically are shifted to the level of the local unit 18a for processing there. An illustration will be given hereinafter. The other tasks are presented to the operator on the screen of the console 182a. In the extreme case, all the tasks initially intended for the work station 143 will advantageously be transferred in a logical manner to a local interface unit 18a and to the associated work station 182. This work station thus substitutes completely for the work station associated originally with the outfit 14a. In this case, the link 15 can be connected directly to the connector 180C of the processing block 180 of the local unit and takes the role of the link 15'.

Figure 4:
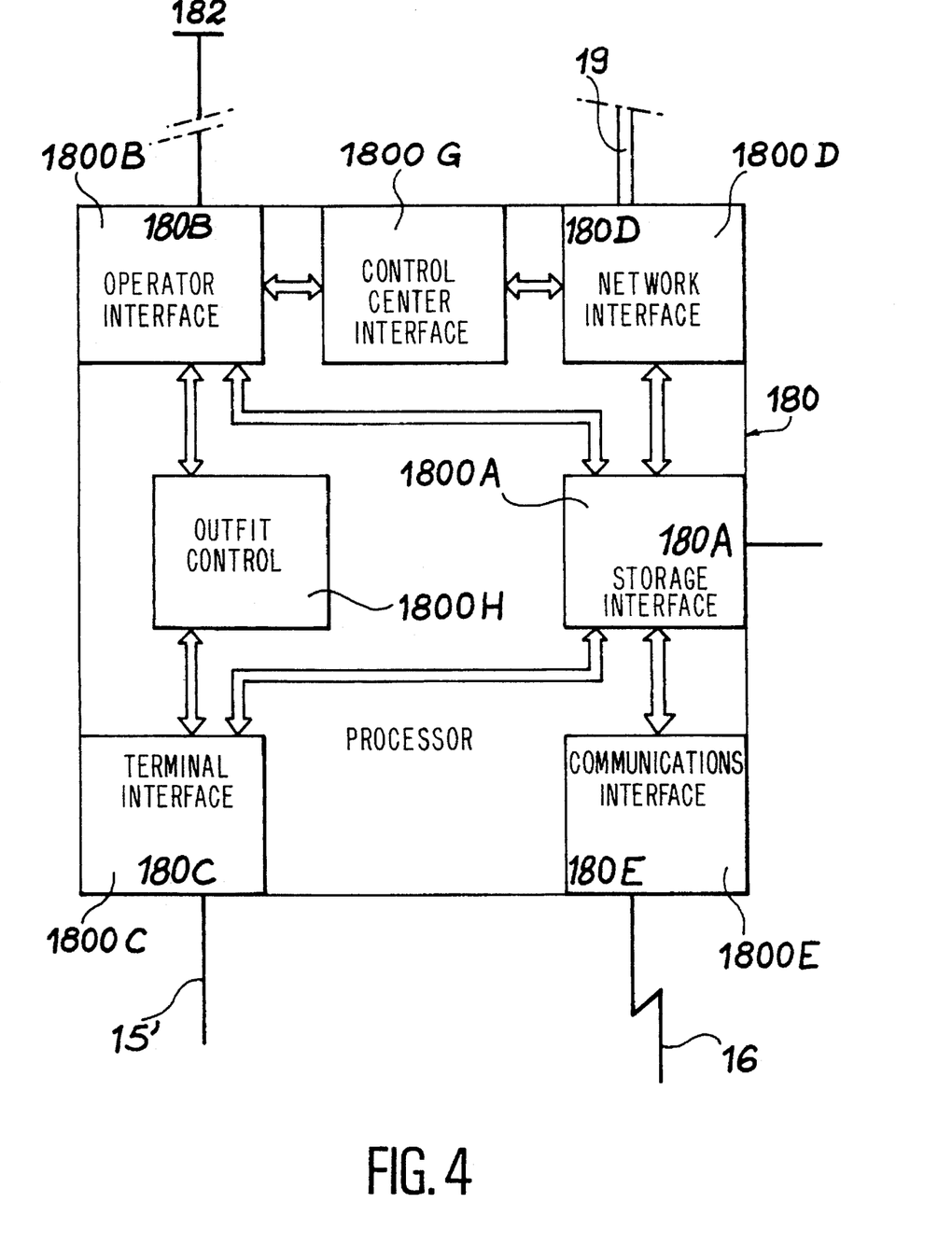
FIG. 4 is a diagram showing the general functionalities of the local interface unit shown in FIG. 3.

FIG. 4 shows the principal functional elements of the local block 180 of the local unit 18a. The five connectors 180 A, B, C, D and E are associated respectively with five elements: a storage interface 1800A, an operator interface 1800B, a terminal interface 1800C, a network interface 1800D and a communication interface 1800E. The operator interface 1800B is connected to the network interface 1800D via a shop floor control center interface 1800G. The operator interface 1800B is connected to the terminal interface 1800C by the intermediary of an element 1800H for control of the outfit 14a. Finally, the storage interface 1800A is connected directly to the operator interface 1800B, the network interface 1800D, the terminal interface 1800C and the communication interface 1800E.

The principle of functioning of the outfit 14a associated with its local unit 18a is as follows. First, it is done such that the software used, in the usual manner, in the processing block 180a of the local unit 18a is independent of the software particular to the functioning of the outfit 14a and utilized solely by the computer 141 (for instance, for the machine). Secondly, the processing block 180 of the local unit is adapted for at least partly controlling the computer 141 of the outfit 14a by the intermediary of the communication line 16. Optionally, the terminal link 15' may also be used to perform this controlling. The partial controlling of the computer by the work station 182 of the local interface unit effects the logical association with the work station 143 of the outfit 14a. However, as noted above, the processing block advantageously controls the functioning of the outfit, at least in the normal mode. The other functional modes described hereinafter may be left to the work station 43.

In the case of the outfit 14a, the computer 141 of which lacks a storage unit, the local unit 18a procures the storage unit 181 for the computer 141 and connects the computer 141 and the storage unit 181 to the LAN 11. Functionally, the invention comprises sending the storage unit 181 a copy of programs contained in the set of file servers 123 of the shop floor control center 12, and assigning to the local unit 18a the management of the file directory used by the computer 141 of the outfit 14a. The detailed functioning of the outfit 14a in the environment of the shop floor control system 10 according to the invention will now be described.

A particular program corresponding to a given product manipulated in the factory 10 is known as a numerical control part program, or NC-program. This may for instance be a test program, a verification program, or a particular operation performed on the product. Generally, the NC programs have their original archived in the set of file servers 123. The saving of these originals are then performed in this file server set. According to the invention, the programs available at the level of the work station 182 are copies which are furnished on demand from these work stations and are stored in the unit 181. The storage unit 181 can thus be compared to a cache storage in an equivalent set with a multiprocessor architecture having the LAN 11 as a bus and the local storage unit 181 as the specialized multiprocessor element. However, it will be understood that the probability of locally having the necessary NC program or programs available for executing the work initialized by the operator at the work station 182 will vary, depending on the capacities of the local storage unit 181 and on the size of the programs used by the outfit 14a.

On the other hand, any message from the automated factory system 10 pertaining to the initialization of processing by an operator at the work station 182 contains the names of the logical and physical tools to be used. The appropriate NC programs that are not available in the local storage unit 181 are called up by the local unit 18a for downloading. Thus the transfer of files between the file server set 123 and the work station 182 is automatically managed by the local interface unit in a totally transparent manner for the operator working at such a work station. A function analogous to the NC programs is performed at the level of the files describing the documents to be posted to the work stations. Finally, the local unit 18a manages a dictionary of NC programs. The principal purpose is to initialize a transfer if the file is not present in a local storage unit 181. It will also be advantageous that this management is done in order to apply a strategy of erasing files that have the least chance of being re-used in the near future when a problem of space at the level of the local storage unit 181 presents itself.

Moreover, the processing block 180 of the local interface unit 18a makes it possible to distinguish the information that must be printed from information that can be retained in memory. The information to be printed may be taken over by the printer 144 of the standard outfit such as that shown in FIG. 2. The information may also be taken over partially or completely by the printer 183 of the local interface unit 18a.

Knowing that the outfit 14a adapted by the local unit 18a in accordance with the invention is an often rudimentary outfit that is not very powerful, lacks a storage unit and has only one asynchronous communication line, the local unit 18a must have all the functionalities required for compensating for or adapting to the low power of the outfit 14a. The functionalities described above illustrate all the possibilities offered by the invention. It will be understood, however, that the more sophisticated the equipment and the greater its capacity, consequently more functionalities of the corresponding local unit can be selected and improved. Several examples of more-sophisticated conventional outfits are suggested in FIG. 2. FIG. 1 schematically illustrates the adaptation according to the invention of these more-sophisticated outfits. The outfit 14b and its local unit 18b will be considered first, and then the outfit 14c and its local unit 18c, and finally the outfit 14d and its local unit 18d.

The outfit 14b and its local unit 18b correspond to the adaptation according to the invention of the conventional outfit such as that shown in FIG. 2, the computer 141 of which is provided with the storage unit 142 and with only the asynchronous line 16. The outfit 14b thus differs from the outfit 14a in the presence of the storage unit 142 associated with the computer 141. It will be apparent from the foregoing description that the local units 18a and 18b have substantially the same structure and the same functionalities. However, the local unit 18b connects the computer 141 and its storage unit 142 in the outfit 14b to the LAN 11. The presence of the storage unit 142 can make the local unit 18b more powerful with respect to the local unit 18a. Thus the copy of programs contained in all the data servers 123 is stored in the storage unit 142. As a general rule, local storage is done with priority in the storage unit 142 of the outfit.

Finally, the local unit 18b manages the directory in the same manner as the local unit 18a. Advantageously, the local unit 18b will have in its directory the history of files issued by the set of file servers 123 and contained in the storage unit 142 and will manage the space in this storage unit. Consequently, for example if there is no more space in the storage unit 142, the local unit 18b can, because of its knowledge of the history of the files, suppress one or more of these files in order to have sufficient space in the storage unit 142 for the required storage of a file. The local unit 18b can have statistics available on the use of the files in order to apply the algorithm of their elimination in the case where there is insufficient space in the storage unit 142. The files that have the least chance of being re-used in the near future can then be erased. Naturally, the local unit 18b does not have as fine a view as the computer 141 of the volumes of storage liberated in the unit 142. Consequently, this elimination strategy can lead to eliminating a number of files greater than the space desired, in order not to have the problem of space again within the near future. On the other hand, the management of the file directory by the local unit 18b will advantageously include the reconstitution of the dictionary of the local unit, in the case of an accident, beginning with the contents of the storage unit 142 of the outfit 14b. Another advantage attainable with the local unit 18b comprises reading files contained in the storage unit 142, particularly those relating to results obtained by the outfit or files generated by machine learning or developed in the outfit.

The outfit 14c and its local unit 18c shown in FIG. 1 are the adaptation according to the invention of a standard outfit such as that shown in FIG. 2, in which the computer 141 is provided with the storage unit 142 and the line 17 instead of the asynchronous line 16. The line 17 is adapted to the LAN 11 by an interface particular to the computer 141 and generally permits high-output transfers. The outfit 14c adapted in accordance with the invention retains the original link 17 with the LAN 11. However, an additional asynchronous communication line 16' to the local unit 18c is added. Under these conditions, the local unit 18c substantially retains the same structure and functionalities as those of the local unit 18b. In other words, the local unit is connected to the computer 141 of the outfit 14c via the line 15' and via the asynchronous line 16' similar to the line 16. The local unit 18c moreover is still connected to the LAN 11 by the line 19. However, the increased capacity of the computer 141 of the outfit 14c as compared with the outfits described above enables a further improvement in the capacity of the corresponding local unit 18c by comparison with the local unit 18b. Basically, the local unit 18c will profit from having the original high-output line 17 partly accomplishing certain tasks, while other tasks can be done simultaneously by making use of the line 19. For example, it will be highly profitable to assign to a local unit 18c the management of the directory and the preparation for a transfer of data and the performance of this transfer on the original line 17. In other words, the transfer of a file is commanded by the local unit 18c, but is performed by bypassing this local unit. This local unit simply makes a notation of the transfer in its own library. The other functionalities of the local unit 18c can be similar to those of the local unit 18b. In particular, the local unit 18c will have in its directory the history of files issued from the set of file servers 123 and contained in the storage unit 143 in such a manner as to manage the space in this storage unit.

Figure 5:
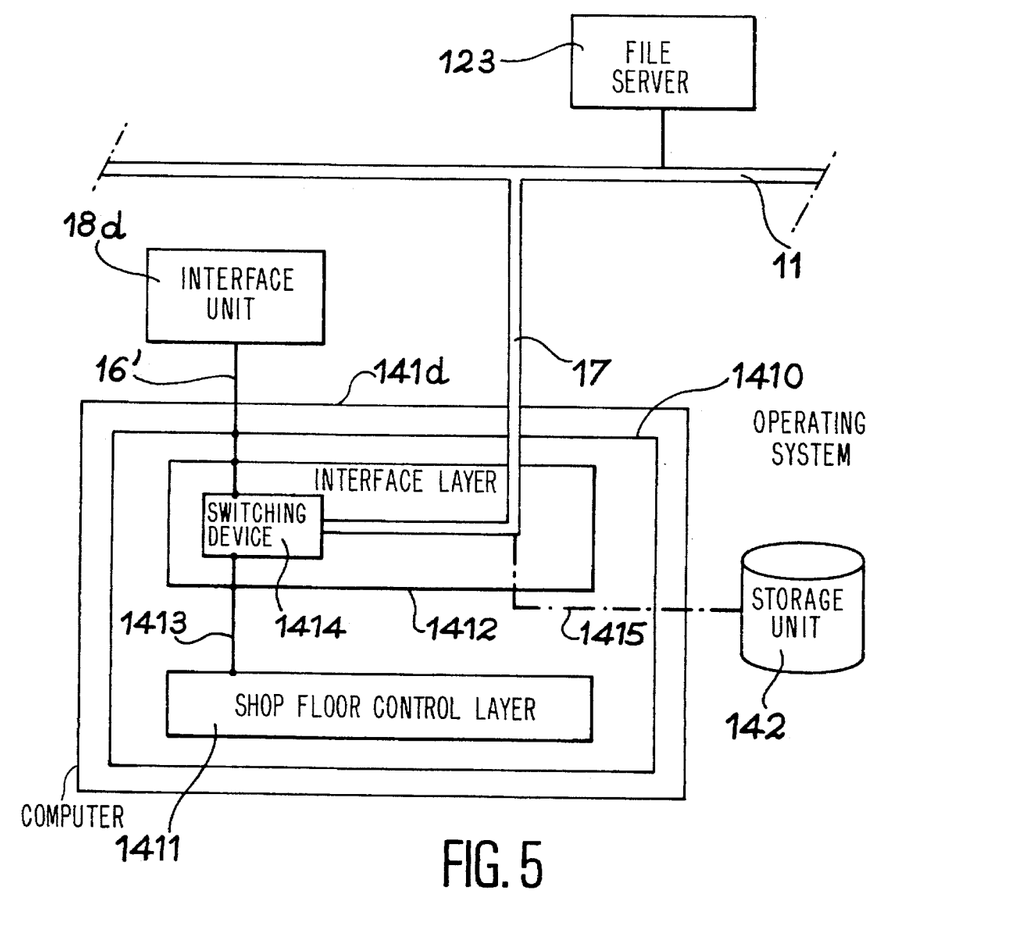
FIG. 5 is a schematic view of the structure of the operating system, of the computer of an outfit which is provided with an original link connected to a local area network and in accordance with the invention is associated with a local interface unit connected to the local area network by the intermediary of the original link of the outfit.
Figure 6:
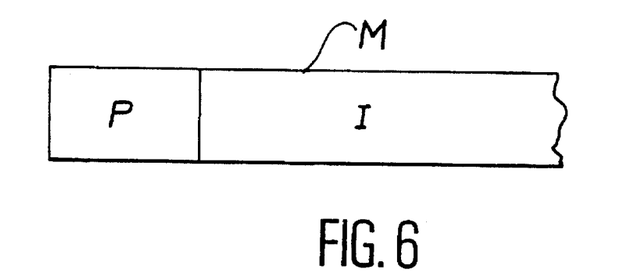
FIG. 6 schematically illustrates the structure of a message used by the outfit and the local unit shown in FIG. 5.

The outfit 14d and its local unit 18d, which are shown in FIG. 1, comprise a variant embodiment of the outfit 14c described above and its local unit 18c. In fact, the two outfits 14c and 14d both have the original communication line 17. In the variant according to the invention, the original line 17 is retained and substitutes for the line 19 in the local unit 18d; line 19 was retained in the local unit 18c. The local unit 18d no longer has the line 19 and uses only the lines 15', 16 and 17. In this configuration, the local unit 18d is associated simply with the computer 141 of the outfit 14d. The problem presented is thus the management of internal messages relating to the shop floor control of the outfit and external messages intended to be sent between the local unit 18d and the local area network 11. FIG. 5 is a schematic illustration of the functional connections between the computer 141 of the outfit 14d, the associated local unit 18d, the line 17, the LAN 11 and the set of file servers 123. FIG. 6 illustrates the structure of a message that can advantageously be used in the configuration of FIG. 5.

Turning to FIG. 5, the portion 1410 symbolizes the operating system of the computer 141 of the outfit 14d. The operating system 1410 comprises several software layers, in particular a layer 1411 particular to the shop floor control of the outfit and a layer 1412 for interface with the local unit 18d. The line 16' for communication between the local unit 18d and the computer 141 then terminates at the interface layer 1412. The interface layer 1412 is connected logically to the line 17 for the external messages and to the layer 1411 by the intermediary of a logical communication line 1413 that carries internal messages. In accordance with the invention, the interface layer 1412 includes a logical switching device 1414 connected to the line 16', the line 17 and the logical line 1413. The device 1414 effects a switching of data such as to selectively establish a transfer between the local unit 18d and the functions of the computer pertaining to the outfit 14d and contained in the layer 1411, and between the local unit 18d and the LAN 11 by the intermediary of the line 17. In other words, the switching device 1414 effects a selection between the external messages and the internal messages. Advantageously, every internal or external message will have the structure of the kind shown in FIG. 6 for the message M. The message M incorporates a preamble P serving as an indicator of the origin or destination of the massage, and an information portion I representing the contents per se of the message. For example, the switching will be done by incorporating a preamble P1, representing the destination of the message, into every message M emitted by the local unit 18d and a preamble P2 representing the origin of the message into any message intended for the local unit. Moreover, as indicated by broken lines in FIG. 5, a logical line 1415 may be established between the set of file servers 123 and the storage unit of the outfit 14d. This connection is clearly needed by the local unit 18d and is managed or checked by the layer 1412.

Finally, there remains the local interface unit 18e simply connected to the work station 13. It will now be understood that the local interface unit 18e has the same structure as that of the unit 18a. The work station 13 corresponds to the work station 182. The connector 180E of the processing block 180 advantageously remains available with a view to future connection with some outfit. It will be understood that the functioning of the unit 18e is similar to that of the unit 18a, and provides a standard interface with the LAN 11 and the shop floor control center 12 while furnishing resources adapted to the sophistication of the work station.

It should be noted that the line 16 or 16' can advantageously be replaced with a synchronous line or a line of the type that can be connected to a local area network. The line 16 or 16' has been assumed to be an asynchronous communication line, because such a line is typically available in present-day outfits.

The functionalities, i.e., processing options, of a local unit have now been presented and the ensuing discussion will address various modes of functioning that a local unit may have, for example the unit 18a. Besides a normal mode, it is possible to provide various other modes, such as those cited as an example below. The normal mode corresponds to the normal job done by a production operator in the context of the factory 10. Generally, this job includes the connection and disconnection of the work station to the shop floor control center 12 via the LAN 11; the opening and closing of the work station; identification of the operator; transmission of operator movements; and at least one operation to be performed. In the context of a factory for manufacturing printed circuit boards and assembling components on the boards, the operation may, for example, be the process of inserting components on a batch of printed circuit boards. Given that a local unit according to the invention comprises standard widespread hardware and software, the standard operations, other than that of the given operation, are performed in the ordinary manner. For the selected operation, the operator at the work station 182 uses: the bar-code reader 182b to read the number of the container of the batch in question. This operation results in the sending of a message by the local unit to the shop floor control center 12, and, more particularly, to the central computer 121. The computer sends a message to the local unit 18a that includes the information permitting the local unit to have the sequence of screens appropriate to the processing of the batch and to assure the acquisition of information and checking it for coherence. At the same time, the shop floor control center 12 transmits the NC program references and documents (instruction files) to the local unit 18a for use in processing the batch. The local unit 18a loads the programs corresponding to the references received into the memory of the computer 141. If these programs are not available in the storage unit 181, the local unit retrieves them from the set of file servers 123 in order to store them locally (in the storage unit 181) and load them into the memory of the computer 141. This is done automatically, in a manner that is transparent to the operator. The execution of the job can be done in accordance with these programs, if necessary via a dialogue with the local applications of the set of dedicated monitors 125 of the shop floor control center 12. The termination of the processing of the batch is done with the transmission of an acknowledgement to the shop floor control center 12.

The shop floor control system 10 according to the invention will also advantageously include a functional mode known as "methods". This mode comprises a test for validity of the original programs contained in the set of file servers 123.

This mode is accessible beginning by reading of a code such as "operator methods". This mode makes it possible to call up an NC program to be tested. The file relating to this NC program is loaded into the corresponding local unit, without any possibility of being used in a normal mode. The validation of the NC program is performed. In this made, an NC program produced or modified locally can be stored in the set of file servers 123. Each time this is possible, an emulation of the console of the outfit is done by the console 182 of the corresponding local unit. The library of NC programs contained in the storage unit 142 of the corresponding outfit may be reconstituted in the storage unit 181 of the associated unit 18. The time for execution of a test will advantageously be recorded.

Another mode relative to maintenance may also be provided. This mode is accessible beginning with the reading of a code such as "operator maintenance". This mode should afford functions for maintenance upstream, that is, toward the shop floor control center 12, or downstream, toward the outfit. Nevertheless, so as not to entail task loads not adapted to needs, it is appropriate that fine maintenance of the outfit may entail reconnection of the original console 143 in the case where it was capable of being disconnected.

Figure 7:
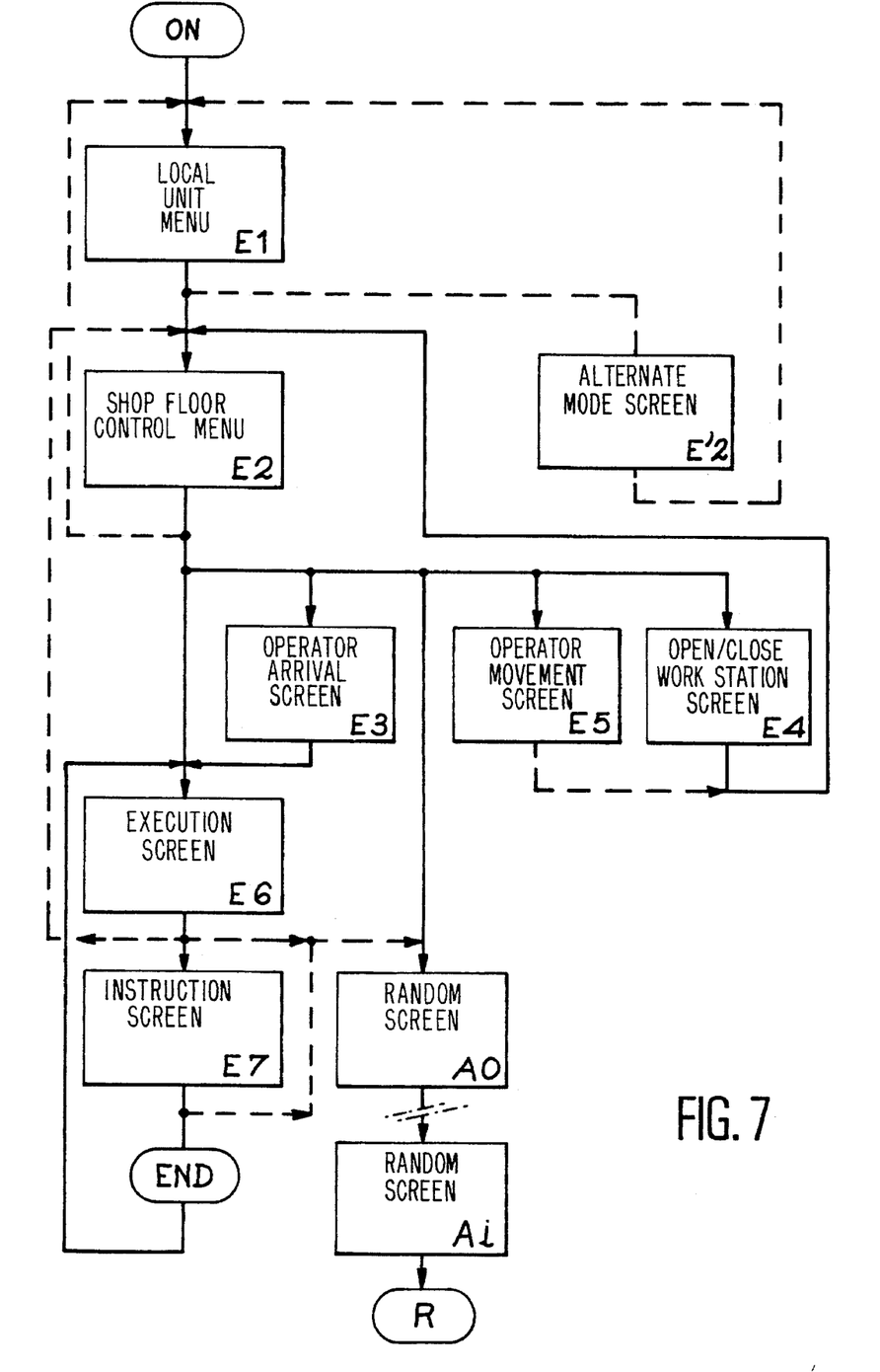
FIG. 7 is a flow chart representing one example of interlinking of screens at the work station of a local interface unit according to the invention.

The interface with the operator and the associated screens will now be described, as shown in FIG. 7. A local unit according to the invention has the objective of comprising a simplified interface with the operator, which each time this is possible makes it possible to offer all the functionalities at the level of a single console. It has been noted that the example of attaining shop floor control according to the invention has used the BM60 console as the base console, with a bar-code reader associated with it. Two levels of language are offered on the console screen; one is a standardized language corresponding to the visibility that the operator has with respect to the various elements with which he is associated, and one is a language dedicated to the operation of the outfit associated with the work station. The level of the dedicated language is naturally a function of the outfit and of the mode in which it is operating. The standardized language appears on the screens, which will now be explained, with their interlinking, with reference to FIG. 7. These screens and their interlinking are managed directly by the local unit associated with the outfit used. It should be noted that all the screens relating to the local unit have the characteristic of being stable screens, with little risk of being altered.

Turning to FIG. 7, it can be seen that when the local unit is connected to voltage or turned "ON", the screen E1 appears, presenting the general menu of the local unit. The screen E1 is followed by a screen E2, in the normal mode, showing the general shop floor control menu. The other modes that have been described above correspond to screens E'2, in a group upstream of the screen E1. The screen E2 may be succeeded by a plurality of types of screen. For example, one can imagine a screen E3 relating to the arrival of the operator, a screen E4 relating to the opening and closing of the work station, and a screen E5 relating to the movements of the operator. The screens E4 and E5 loop back to upstream of screen E2. In the case of impossibility, the sequel to the screen E2 is to return the local unit to the initial state. However, the normal sequel to the screen E2 is the execution of a task. The task in question is as described above with respect to the NC programs. This task would involve the processing of a batch of boards in a factory for assembling printed circuits. For example, as a first execution screen, one can imagine a screen E6 for reading the container of the batch. The screen E6 may optionally appear following the screen E3. Normally the screen E6 is succeeded by a screen E7 that posts the instructions. However, the order of the screens E2, E6 and E7 may lead to a random screen AO. A succession of random screens A1, . . . Ai furnishes a return R to the calling screen. The screen AO may also be the one that follows the screen E2. Normally, the screen E7 manages other screens until the end END of the processing of the batch. At the end of the processing of the batch, a return is made to upstream of the screen E6. Finally, it may be that a return should be made upstream of the screen E2 by exiting from screen E6 and other successive screens.

What is claimed is:

1. A method for shop floor control of work stations wherein a computer system for shop floor control of the work stations is provided and comprises at least one outfit for processing tasks, a local area network connected to a first direct communication line, and a shop floor control center including a data server, said outfit comprising a computer connected to a communication line, a local interface unit comprising local storage means for locally storing data and local processing means for locally processing data, said local processing means being connected to a local work station, the communication line of the outfit and said first direct communication line, the invention being characterized in that the method for shop floor control of said outfit comprises:

shifting, at least in part, said tasks assigned to said outfit to said local processing means and said local work station;

controlling said computer through said communication line from said local processing means via said interface unit, by transferring files between said data server of the shop floor control center and said local storage means through said first direct communication line and said local area network, said transferring step including initializing a file transfer from the shop floor control center when a requested file is not present in said local storage means without user intervention; and managing storage space in said local storage means by employing a strategy of erasing files stored in said local storage means.

2. The method of claim 1, wherein said transferring step further includes storing in said local storage means copies of files from said shop floor control center and/or storing files from said local interface unit in said shop floor control center.

3. The method of claim 1, wherein said outfit includes a storage unit and wherein said transferring step further includes storing copies of files from said shop floor control center with priority in said storage unit and alternatively in said local storage means.

4. The method of claim 1, wherein said computer of said outfit is further connected through a second direct communication line to the local area network and said transferring step further comprises preparing a file transfer in the local interface unit and performing the file transfer over said second direct communication line instead of said first direct communication line.

5. The method of claim 1, wherein said shop floor control center further includes a shop floor control computer (121) and said transferring step further comprises transferring data between said local processing means of the local interface unit and said shop floor control computer through said local area network.

6. The method of claim 1, wherein said shop floor control center further includes application monitor means for monitoring local applications and said transferring step further comprises transferring data between said local processing means of said local interface unit and said application monitor means through said local area network.

7. The method of claim 1, wherein said first direct communication line is connected to said computer of said outfit and further including the step of switching data in such a manner as to selectively transfer data through a first path between said local processing means and said computer and a second path between said local processing means and said local area network through said communication line and said first direct communication line.

8. The method of claim 7, wherein said data is transferred in messages (M) and said step of switching data further comprises incorporating a first indicator (P2) into each of said messages from said local processing means and a second indicator (P1) into each of said messages to said local processing means.

9. The method of claim 1, further including the step of using said communication line as an asynchronous line.

10. A computer system for shop floor control of a work station, comprising:

at least one outfit;

a local area network connected to a first direct communication line;

a shop floor control center including a data server;

said outfit comprising a computer connected to a communication line;

a local interface unit comprising local storage means for locally storing data, and local processing means for locally processing data, said local processing means being connected to a local work station, said communication line of the outfit and said first direct communication line;

said local processing means controlling said outfit through said communication line via said interface unit and having means for managing said file director of said computer;

means for transferring files between said data server of the shop floor control center and said local storage means through said first direct communication line and said local area network, said transferring means initializing a file transfer from the shop floor control center when a requested file is not present in said local storage means without user intervention; and means for managing storage space of said local storage means by applying a strategy of erasing files stored in said local storage means.

11. The shop floor control system of claim 10, wherein said transferring means includes means for storing in said local storage means copies of files from said shop floor control center and/or for storing in said shop floor control center files from said local interface unit.

12. The shop floor control system of claim 10, wherein said outfit includes a storage unit and said transferring means includes means for storing copies of files from said shop floor control center with priority in said storage unit and alternatively in said local storage means.

13. The shop floor control system of claim 10, wherein said computer of said outfit is further connected through a second direct communication line to said local area network and said transferring means further comprises means for preparing a file transfer and performing said file transfer over said second direct communication line instead of said first direct communication line.

14. The shop floor control system of claim 10, wherein said shop floor control center further includes a shop floor control computer and said transferring means further comprises means for transferring data between said local processing means of said local interface unit and said shop floor control computer through said local area network.

15. The shop floor control system of claim 10, wherein said shop floor control center further includes application monitor means for monitoring local applications and said transferring means further comprises means for transferring data between said local processing means of said local interface unit and said application monitor means through said local area network.

16. The shop floor control system of claim 10, wherein said first direct communication line is connected to said computer of said outfit and said computer comprises means for switching data in such a manner as to selectively transfer said data through a first path between said local processing means and said computer and a second path between said local processing means and said local area network through said communication line and said first direct communication line.

17. The shop floor control system of claim 16, wherein said data is transferred in messages (M) and said switching means comprises a first indicator (P2) in each of said messages from said local processing means and a second indicator (P1) in each of said messages to said local processing means.

18. The shop floor control system of claim 10, wherein said communication line is an asynchronous line.

19. The shop floor control system of claim 10, wherein said local processing means comprises a personal computer.

20. The shop floor control system of claim 10, wherein said local area network is of a standardized industrial type.

* * * * *